United States Patent [19]

Lott

[11] Patent Number: 4,493,950
[45] Date of Patent: Jan. 15, 1985

[54] LOUDSPEAKER TELEPHONE
[76] Inventor: Thomas M. Lott, 55 W. Santa Inez Ave., San Mateo, Calif. 94402
[21] Appl. No.: 434,865
[22] Filed: Dec. 17, 1982
[51] Int. Cl.³ .............................................. H04M 9/08
[52] U.S. Cl. .............................. 179/81 B; 179/100 L
[58] Field of Search ................ 179/81 R, 81 B, 100 L
[56] References Cited
U.S. PATENT DOCUMENTS
3,772,472 11/1973 Blomberg ........................ 179/100 L
4,115,659 9/1978 Spanel et al. ..................... 179/81 B Primary Examiner—Gene Z. Rubinson
Assistant Examiner—James L. Dwyer
Attorney, Agent, or Firm—Robert G. Slick

[57] ABSTRACT

A line powered loudspeaker telephone is provided with a lightweight headset and microphone as well as a loudspeaker and second microphone. A first switch is employed to go from the loudspeaker to the headphone and their respective microphones while a second switch is used as a listen-talk switch, preventing acoustical feedback.

1 Claim, 1 Drawing Figure

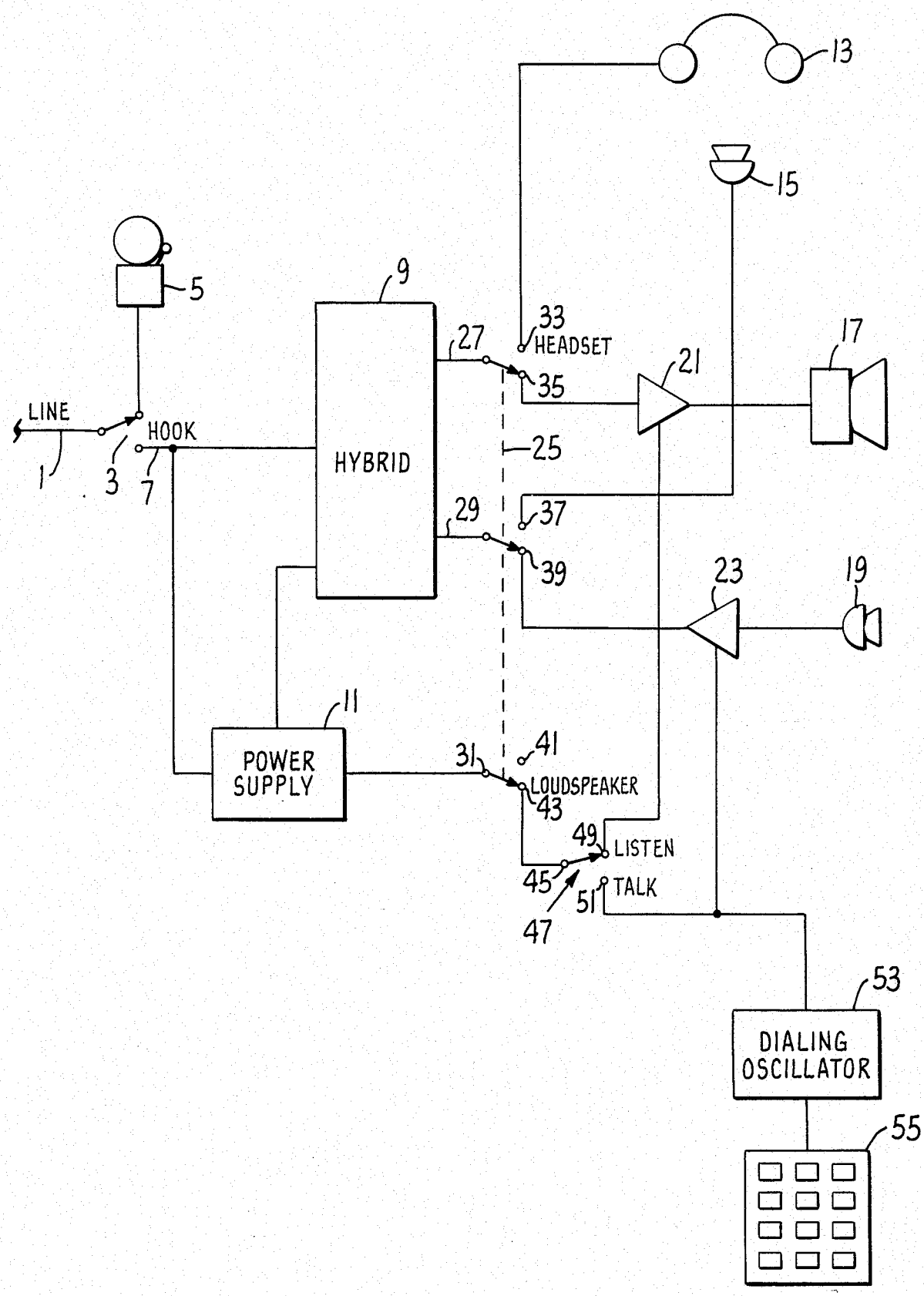

LOUDSPEAKER TELEPHONE

SUMMARY OF THE INVENTION

As is well-known, the main problem with a loudspeaking telephone is the prevention of acoustical feedback between the microphone and loudspeaker circuits and normal commercial units use very elaborate switching circuits to prevent this feedback.

Another problem is that the amount of current that may be drawn from a telephone line is limited by both the telephone company and government regulations as well as technical considerations. Thus, the problems of making an inexpensive telephone line powered unit are considerable.

In the herein described unit, the power is only switched to the loudspeaker amplifier in the "listen" position and to the microphone amplifier in the "talk" position of the push-to-talk switch. There is no possibility of acoustical feedback and the full amount of available power is available for each function separately.

Since the purpose of the semi-loudspeaking telephone is for use with a small, very lightweight headset, which is switched in to replace the amplifiers when a conversation of more than a few moments is contemplated, the inconvenience of having to push-to-talk is more than compensated for by not having to bother with a handset or the headset when initiating or answering a call.

BRIEF DESCRIPTION OF THE DRAWINGS

The sole FIGURE of the drawing is a schematic diagram of a preferred embodiment of the invention.

DESCRIPTION OF THE PREFERRED EMBODIMENT

In accordance with the present invention, a telephone line 1 is connected through a hook switch 3 to an alarm device such as a bell 5 or an incoming line 7 and power supply 11. Line 7 leads to the usual hybrid circuit 9. Such hybrid circuits are well-known to those skilled in the art. They ordinarily consist of a transformer having a balanced primary winding wherein the transmitter feeds into a network which is balanced with respect to the receiver so that the transmitter does not induce an output into the receiver and wherein the incoming voltage from the line passes through a balancing network to the receiver. The hybrid also serves to balance the impedance between the telephone set through the circuit and reduce side tone and to provide for transmission equalization. However, recent developments in solid state circuitry now enable a small integrated circuit to perform all the hybrid functions electronically and this is the preferred usage in this invention.

In accordance with the present invention, a lightweight headset and microphone combination designated 13 and 15, respectively, are employed. These will be placed on the head of the user for protracted calls, ordinarily after the call has been initiated, and the called party is on the line.

In addition, the phone is provided with a loudspeaker 17 and a second microphone 19 which are used when one wishes to operate the receiver without placing the headphone and microphone on the head. An amplifier 21 is provided for the loudspeaker 17 and a second amplifier 23 is provided for microphone 19. It is not necessary to provide any power supply for the headphone 13 or the microphone 15 since these are both very low power units and, if a solid state hybrid is employed, will not require any further amplification.

A three-pole two-throw switch 25 is provided to switch between the headset and the loudspeaker and their associated microphones. The input from the first pole goes through line 27 to the output circuit from hybrid 9. The center of the second pole 29 is connected to the output circuit of the hybrid 9. The third pole 31 is connected to the power supply. The power supply 11 consists of a small bridge rectifying circuit and a solid state voltage regulator. The rectification is required to ensure that the same polarity is fed to the voltage regulator, regardless of the polarity of the incoming line. The upper throw 33 leads to the headset 13 while the lower throw 35 leads to the amplifier 21 for the loudspeaker. The upper throw 37 leads to the microphone 15 while the lower throw 39 leads to the output of the amplifier 23 from microphone 19. No connection is made to the upper throw 41 while the lower throw 43 is attached to the center terminal 45 of the listen-talk switch. The upper throw of switch 47 connects the power supply to the amplifier 21 for the loudspeaker 17 while the lower throw 51 connects the talk switch to the amplifier 23 for microphone 19 and also places the dialing oscillator 53 and the associated Touch Tone ® pad 55 into the amplifier 23.

When the system is in the standby condition, the switches would be in the positions shown. As soon as the alarm 5 is actuated, the hook switch 3 would be activated, connecting the line 7 to the hybrid which in turn activates the loudspeaker 17. However, for the moment, the microphone 19 would be inoperative until one wished to talk at which time the switch-to-talk switch 47 would be actuated. Although it is a minor inconvenience to push a switch to listen or to talk, the possibility of acoustical feedback is completely eliminated in a very simple and inexpensive manner. Now, if one wished to carry on an extended conversation, one would move the switch 25 to the upper position connecting the headset 13 and microphone 15. Now it is not necessary to press the listen to talk switch so one could carry a conversation on in the usual manner. Since the loudspeaker is inactivated, there is no substantial possibility of acoustical feedback. Also in this position there is no drain on the power supply.

I claim:

1. A line powered telephone receiver and transmitter which is capable of being operated in a handset mode and in a loudspeaker mode comprising in combination:
    (a) a lightweight headphone and first microphone,
    (b) a loud speaker and second microphone,
    (c) an amplifier for said loudspeaker,
    (d) an amplifier for said second microphone,
    (e) a hybrid circuit for separating incoming from outgoing signals,
    (f) a power supply operated by telephone line current,
    (g) a three pole double throw switch,
    (h) a single pole double throw switch
    (i) said three pole switch having one position connecting said headset and said first microphone to said hybrid circuit and a second position connecting said power supply to the center pole of the single pole switch and said hybrid circuit to the loudspeaker and second microphone, and
    (j) said second switch having a listen position activating said loudspeaker amplifier and a talk switch actuating said second microphone amplifier.

* * * * *